United States Patent [19]
Borroni-Bird et al.

[11] Patent Number: 5,983,628
[45] Date of Patent: Nov. 16, 1999

[54] SYSTEM AND METHOD FOR CONTROLLING EXHAUST GAS TEMPERATURES FOR INCREASING CATALYST CONVERSION OF NOX EMISSIONS

[75] Inventors: Christopher E. Borroni-Bird, Rochester Hills; Thomas L. Kizer, Farmington Hills, both of Mich.

[73] Assignee: Chrysler Corporation, Auburn Hills, Mich.

[21] Appl. No.: 09/014,852

[22] Filed: Jan. 29, 1998

[51] Int. Cl.$^6$ ................................................. F01N 3/00
[52] U.S. Cl. ................................ 60/274; 60/277; 60/286; 60/298; 60/303
[58] Field of Search ........................... 60/274, 276, 284, 60/286, 290, 298, 300, 303, 277

[56] References Cited

U.S. PATENT DOCUMENTS

| | | |
|---|---|---|
| 3,599,427 | 8/1971 | Jones et al. . |
| 3,747,346 | 7/1973 | Onoda et al. . |
| 3,812,673 | 5/1974 | Muroki et al. . |
| 3,817,032 | 6/1974 | Crow . |
| 3,819,334 | 6/1974 | Yoshida et al. ................ 23/288 F |
| 3,820,327 | 6/1974 | Henault . |
| 3,835,645 | 9/1974 | Zoleta . |
| 3,898,802 | 8/1975 | Tadokoro et al. . |
| 3,910,042 | 10/1975 | Yuge et al. . |
| 3,947,544 | 3/1976 | Yamada et al. . |
| 3,967,929 | 7/1976 | Tamazawa et al. . |
| 3,968,649 | 7/1976 | Edwards ........................... 60/297 |
| 3,979,185 | 9/1976 | Stevenson . |
| 4,091,616 | 5/1978 | Loweg . |
| 4,272,958 | 6/1981 | Waltrip . |
| 4,291,760 | 9/1981 | Argvle et al. . |
| 4,391,235 | 7/1983 | Majkrzak . |
| 4,426,844 | 1/1984 | Nakano . |
| 5,158,753 | 10/1992 | Take et al. . |
| 5,216,880 | 6/1993 | Aoki et al. . |
| 5,224,334 | 7/1993 | Bell . |
| 5,255,511 | 10/1993 | Maus et al. . |
| 5,398,747 | 3/1995 | Miaoulis . |
| 5,450,721 | 9/1995 | Golben et al. . |
| 5,560,201 | 10/1996 | Fujishita et al. ................. 60/279 |
| 5,566,547 | 10/1996 | Hosoya et al. . |
| 5,603,215 | 2/1997 | Sung et al. . |
| 5,607,010 | 3/1997 | Schonfeld et al. . |
| 5,634,331 | 6/1997 | Aoki et al. . |
| 5,647,204 | 7/1997 | Atanasyan . |
| 5,651,088 | 7/1997 | Abe et al. . |
| 5,664,049 | 9/1997 | Kondo et al. . |
| 5,685,145 | 11/1997 | Sung et al. ...................... 60/284 |
| 5,694,770 | 12/1997 | Bruck et al. . |
| 5,695,722 | 12/1997 | Myers et al. . |
| 5,753,188 | 5/1998 | Shimoda et al. ................. 60/286 |

FOREIGN PATENT DOCUMENTS

1359660 of 1970 United Kingdom .

*Primary Examiner*—Thomas E. Denion
*Assistant Examiner*—Binh Tran
*Attorney, Agent, or Firm*—Jennifer M. Stec

[57] ABSTRACT

A system for adjusting the temperature of the exhaust emissions from an internal combustion engine so that it is at a temperature that maintains one or more catalysts at their effective operating temperature. This has particular application for NOx control from any lean-burn engine. The system includes a heat exchanger that cools the exhaust emissions by forced air from a variable speed fan. The cooled exhaust emissions are directed from the heat exchanger to the catalyst for conversion. The fan speed is controlled to adjust the amount of cooling of the exhaust emissions in response to various input data, such as the temperature of the exhaust emissions at different locations in the exhaust pipe, engine speed, engine load and the catalyst being used. Two or more catalysts can be incorporated at different locations along the exhaust path and have different operating temperatures so as to control the effectiveness of exhaust emissions conversions for increased efficiency and reduced energy consumption. The incorporation of a temperature-controlled catalytic conversion system allows the catalysts to be placed closer to the exhaust manifold, thus reducing cold-start emissions and extending catalyst durability and long-term emissions control for any heat engine application.

49 Claims, 2 Drawing Sheets

SYSTEM AND METHOD FOR CONTROLLING EXHAUST GAS TEMPERATURES FOR INCREASING CATALYST CONVERSION OF NOX EMISSIONS

BACKGROUND OF THE INVENTION

1. Field of the Invention

The present invention relates generally to a system for controlling the temperature of exhaust emissions from an internal combustion engine. More particularly, the present invention is directed to a system that uses a heat exchanger for controlling the temperature of the exhaust emissions from an internal combustion engine delivered to a catalytic converter so as to increase the conversion of NOx pollutants by a catalyst to harmless by-products.

2. Discussion of the Related Art

There is increasing interest in diesel engines and other lean-burn engines for automotive application because of their inherently higher efficiency and lower carbon dioxide ($CO_2$) emissions relative to a conventional gasoline engine. In general, all internal combustion engines which burn various fuels, such as diesel and gasoline, with air, typically produce undesirable exhaust emissions and particles which may be harmful to the environment. These by-products of the combustion process include unburnt hydrocarbons, carbon monoxide (CO), nitrogen monoxide (NO), nitrogen dioxide ($NO_2$), soot particles, reactive organic gasses, etc. In view of these environmental concerns, most modern vehicles are equipped with an exhaust system having a catalytic converter which functions to reduce or significantly eliminate such exhaust gas pollutants.

Nitrogen monoxide and nitrogen dioxide, generally referred to in the industry as NOx, are considered to be the most difficult exhaust emissions to reduce or eliminate. This is especially true in lean-burn engines, such as diesel engines, two-stroke engines, lean-burn gasoline engines, etc., because these types of engines use excess air to burn the fuel. It is difficult to eliminate NOx emissions in the presence of air, and in order to reduce the NOx emissions, it is necessary to convert the NOx pollutants to harmless by-products using a lean NOx catalyst positioned in the exhaust path.

The use of a lean NOx catalyst to convert NOx exhaust emissions from internal combustion engines into harmless by-products is well understood. Typically, the catalyst is provided within a catalytic converter positioned in the exhaust path such that the exhaust gasses are forced through and around the catalyst. Unfortunately, a problem exists with known lean NOx catalysts which reduces their ability to convert the NOx pollutants. Unlike conventional three way catalysts used in conventional gasoline engines, a lean NOx catalyst works most effectively within a specific, and somewhat narrow, operating temperature range. For example, the catalyst platinum-alumina is only effective to convert NOx emissions when its temperature ranges between 180–220° C. Similarly, the catalyst copper zeolite is only effective to convert NOx emissions when its temperature is in the range of 380–420° C. The temperature ranges are not exact because the catalyst does not work the same at each temperature in the range. Particularly, the effectiveness of the catalyst falls towards the ends of the range in a "bell" shaped manner. Other catalysts are also known, but also have limited operating temperature ranges.

In addition to this specific problem of NOx conversion, in any type of engine with a conventional catalytic conversion system, the heated exhaust gasses from the engine are used to heat the catalyst to its operating temperature. The exhaust temperature can vary under different vehicle operating conditions. However, this presents a problem because if the engine is not operating at or near its normal operating temperature, the catalyst will be too hot or too cold, and will not operate effectively. For example, at vehicle start-up, the catalyst is typically at ambient temperature and the exhaust emissions are not yet at the normal operating temperature. In contrast, higher load demands on the engine, such as from pulling a trailer, going up hill, operating in the desert, etc. typically cause the exhaust temperature to increase. Continued overheating of the catalyst can cause the catalyst to break down and reduce its normal life. For this reason, catalytic converters are usually positioned farther from the exhaust manifold than desirable for effective pollution control during vehicle start-up. In this position, the catalyst takes longer to heat up to its operating temperature range at vehicle start-up.

Different techniques can be used to solve the above discussed conversion problem. For example, it has heretofore been known to combine different catalysts having different operating temperature ranges into a single catalytic converter for increasing the operating temperature range of the catalyst. Additionally, research continues to find a catalyst which operates optimally over wider temperature ranges. Thus, it is an object of the present invention to provide a system which controls the temperature of the exhaust emissions from an internal combustion engine to maintain the temperature of the catalyst within its operating temperature range that includes improvements over the prior art.

SUMMARY OF THE INVENTION

In accordance with the teachings of the present invention, a system is disclosed which uses a heat exchanger to control the temperature of the exhaust emissions from an internal combustion engine which, in turn, are used to maintain a catalyst within its effective operating temperature range. In one embodiment, the exhaust emissions flow through the heat exchanger which cools the exhaust emissions by transferring heat to a forced air stream generated by a variable speed fan. The cooled exhaust emissions are directed from the heat exchanger to the catalyst for conversion. The fan speed is controlled to variably adjust the temperature of the exhaust emissions in response to various input data, such as the temperature of the exhaust emissions at different locations in the exhaust pipe, engine speed and load, and the type of catalyst being used. Two or more catalysts can be incorporated at different locations and which have different operating temperature ranges so as to control the effectiveness of the NOx conversions for increased efficiency and reduction of energy consumption.

In particular embodiments, the heat exchanger and the catalyst can be configured in the same housing. Also, the plurality of catalysts can be provided in a single housing, or separated into different housings at different locations in the exhaust path. Additionally, the catalyst can be positioned closer to an exhaust manifold of the engine without reducing the useful life of the catalyst because the exhaust emissions are cooled prior to encountering the catalyst.

Additional objects, advantages and features of the present invention will become apparent from the following description and appended claims, taken in conjunction with the accompanying drawings.

DETAILED DESCRIPTION OF THE PREFERRED EMBODIMENTS

The following description of the preferred embodiments directed to various techniques for controlling the temperature of exhaust emissions from an internal combustion engine using a heat exchanger is merely exemplary in nature, and is in no way intended to limit the invention or its applications or uses.

Figure 1:
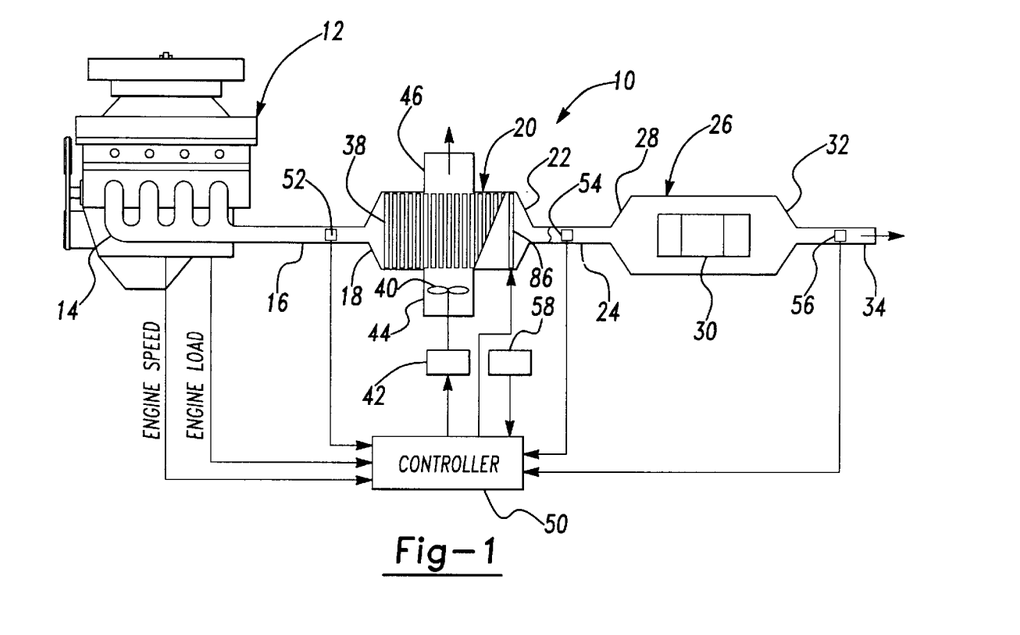
FIG. 1 is a schematic diagram depicting a system for controlling the temperature of the exhaust emissions from an internal combustion engine in accordance with an embodiment of the present invention.

FIG. 1 shows a schematic diagram of a control system 10 for controlling the temperature of the exhaust emissions from an internal combustion engine 12 of a vehicle (not shown). The internal combustion engine 12 is intended to represent all types of internal combustion engines, including gasoline engines, diesel engines, two-stroke engines, marine engines, etc. Since, the operation of these internal combustion engines is well known to those skilled in the art and forms no part of this invention, no discussion of the operation of the engine 12 will be given. The engine 12 burns a fuel-air mixture to create a rotary power supply (i.e., drive torque) for driving the vehicle. The combustion process produces exhaust emissions which are collected by an exhaust manifold 14 and directed into an exhaust pipe 16. The exhaust emissions flowing through exhaust pipe 16 are sent into an inlet cone 18 of a heat exchanger 20, and are then discharged from the heat exchanger 20 through an outlet cone 22 into an exhaust connecting pipe 24. As will be discussed in detail below, the heat exchanger 20 is used to regulate the temperature of the exhaust emissions travelling therethrough. The exhaust emissions are then directed into a catalytic converter 26 through an entrance cone 28 where they are converted into harmless by-products by a catalyst 30. The catalyst 30 is intended to represent any known catalyst, or combination of catalysts, used to convert exhaust emissions into harmless by-products. The exhaust emissions exit the catalytic converter 26 through an exit cone 32 into a tail pipe 34 to be emitted from the vehicle.

The temperature and flow rate of the exhaust emissions will vary depending on the operating conditions of the engine 12. As is conventional, the exhaust emissions are used to heat the catalyst 30 within the catalytic converter 26 to its effective operating temperature range. Thus, it is recognized that it is the temperature of the catalyst itself which allows the catalyst 30 to convert pollutants within the exhaust emissions to harmless by-products. According to the present invention, the heat exchanger 20 acts to reduce the temperature of the exhaust emissions during certain operating conditions of the engine 12 so that by the time the exhaust emissions reach the catalyst 30, they are of a temperature that will heat and/or maintain the temperature of the catalyst 30 to be within its effective operating range. The heat exchanger 20 can be any suitable heat exchanger known in the art that is applicable for the operation described herein. In one example, the heat exchanger 20 is a shell and tube type heat exchanger, such as a staggered tube heat exchanger, known in the art, having tubes 38 running crossways to the flow of the exhaust emissions.

In the embodiment shown in FIG. 1, the exhaust emissions are air cooled by the heat exchanger 20. However, as will be appreciated by those skilled in the art, other techniques for cooling are well within the scope of the present invention, such as liquid cooling. To provide the air cooling, a fan 40 driven by a variable speed electric motor 42 sends an air stream into the heat exchanger 20 through an inlet duct 44. The air stream travels through the tubes 38 and exits the heat exchanger 20 through an exhaust duct 46. As is known, the greater the flow of air through the heat exchanger 20, the greater the cooling of the exhaust emissions depending on the temperature and flow rate of the exhaust emissions. In the configuration discussed herein, the exhaust emissions travel around the tubes 38 and are cooled by the air stream passing through the tubes 38. This can be reversed in that the cooling air from the fan 40 can be sent around the tubes 38 and the exhaust emissions can travel through the tubes 38.

The amount of cooling of the exhaust emissions flowing through heat exchanger 20 is controlled by the speed of the fan 40. An output signal from a controller 50 is applied to the motor 42 to drive the fan 40 at different speeds depending on the desired cooling. The controller 50 can be any suitable computer based controller, and can be the existing powertrain controller or engine controller already present in modern vehicles. The controller 50 is responsive to various electrical inputs which are applied to an algorithm running within the controller 50 to determine the speed of the fan 40. For example, electrical signals indicative of engine speed and engine load can be inputted to the controller 50, and are typically existing input signals to an engine controller. These signals give a representation or estimate of the anticipated temperature and gas flow rate of the exhaust emissions entering the manifold 14.

In order to allow the controller 50 to provide the necessary cooling of the exhaust emissions, a series of temperature sensors are provided to monitor the temperature of the exhaust emissions at different locations in the exhaust path. A first temperature sensor 52 is positioned within the exhaust pipe 16 or the cone 18 of heat exchanger 20 to measure the temperature of the exhaust emissions entering the heat exchanger 20. Additionally, an optional temperature sensor 54 is provided within the connecting pipe 24 to measure the temperature of the exhaust emissions discharged from the heat exchanger 20 and entering the catalytic converter 26. Also, a temperature sensor 56 is positioned within the tail pipe 34 or the cone 32 of the catalytic converter 26 to measure the temperature of the exhaust emissions exiting the catalytic converter 26. An ambient temperature sensor 58 is positioned at any suitable location on the vehicle to measure the ambient temperature, and is preferably positioned proximate the inlet of the inlet duct 44. The sensor 58 can also be a combination temperature and humidity sensor to also provide an indication of the ambient humidity to the controller 50. Both the ambient humidity and temperature will effect the required cooling air flow rates and, thus fan power requirements. The temperature sensor 58 may be any existing ambient temperature sensor already present on the vehicle. Each of the temperature sensors 52–58 can be any suitable temperature sensor for the purposes describe herein, such as a thermocouple. Electrical outputs from each of the sensors are applied to the controller 50 to provide the exhaust emissions algorithm with temperature information for use in variably controlling the speed of the fan 40.

The speed of the fan 40 is determined based on the temperature and gas flow rate of the exhaust emissions and the particular type of catalyst 30. If the catalyst 30 is platinum-alumina, then the controller 50 attempts to maintain the temperature of the exhaust emissions in the tail pipe 34, as sensed by the sensor 56, within the range of, say, 180–220° C. As engine speed and engine load increases or decreases, the controller 50 anticipates changes in the temperature and flow rate of the exhaust emissions, controls the motor 42 to cause increases or decreases in the fan speed, and monitors the actual exhaust emission temperature from the manifold 14 by the temperature sensor 52. The temperature sensor 54 is optional, and can be used to insure that the temperature of the exhaust emissions is being controlled properly. Therefore, based on the anticipated exhaust emissions temperature and flow rate from the engine speed and load signals, the actual exhaust emission temperature entering the heat exchanger 20, and the actual exhaust emissions temperature in the tail pipe 34, the temperature of the exhaust emissions can be maintained in the desired range within the converter 26. In other words, the controller 50 uses all of the input data discussed above to determine the cooling provided by the heat exchanger 20 (or no cooling at all) to set the temperature of the exhaust emissions exiting the heat exchanger 20 to be within a desirable temperature range required for a predetermined catalytic conversion scheme programmed in the algorithm.

Because the heat exchanger 20 provides cooling of the exhaust emissions prior to entering the catalytic converter 26, the catalytic converter 26 can be positioned much closer to the engine 12 than currently applicable for conventional exhaust systems without the concern that the high temperature exhaust emissions from the manifold 14 will damage, deteriorate or shorten the life of the catalyst 30. Because the catalytic converter 26 can be placed closer to the engine 12, the temperature of the catalyst 30 will increase quicker, on the order of several seconds, at vehicle start-up, and therefore, will be within its operating temperature range more quickly. Thus, not only is the catalyst 30 maintained at its operating temperature range at normal and/or high load conditions by the heat exchanger 20, which reduces catalyst and, therefore, emissions, deterioration after many hours of operation but the heat exchanger 20 can also allow quicker catalytic conversion at vehicle start-up, thus reducing cold-start emissions.

In one specific example, the catalyst 30 can be a combination of two or more separate catalysts, such as platinum-alumina and copper-zeolite. The emissions algorithm running in the controller 50 can be programmed to conserve energy by adjusting the temperature of the exhaust is emissions to be within the operating temperature range of either of the two catalysts, depending on the operating conditions of the vehicle. For example, as the temperature of the exhaust emissions increases due to an increase in vehicle speed, load demand, ambient temperature, etc., through the operating range of the lower temperature catalyst, the fan 40 will be driven faster to maintain the temperature of the exhaust emissions within that operating range. When the temperature of the exhaust emissions, as sensed, for example, by the sensor 52, reaches a certain level, the fan 40 can be stopped so that the temperature of the exhaust emissions entering the catalytic converter 26 swiftly increases to be within the range of the higher temperature second catalyst. More specifically, in this scenario, the fan 40 could be operating at maximum cooling capacity to cause exhaust emissions cool down from a temperature just below 380° C. to reach 220° C. for the lower temperature catalyst, and then be completely turned off to force a rapid warm-up from 220° C. to 380° C. for the higher temperature catalyst as the exhaust emissions temperature continues to increase. This scenario is effective because a significant fraction of the NOx emissions on the FTP cycle coming out of the engine 12 are at a temperature above 220° C. Also, the emissions algorithm may consider that the catalysts are less effective at the edges of these given operating ranges.

Figure 2:
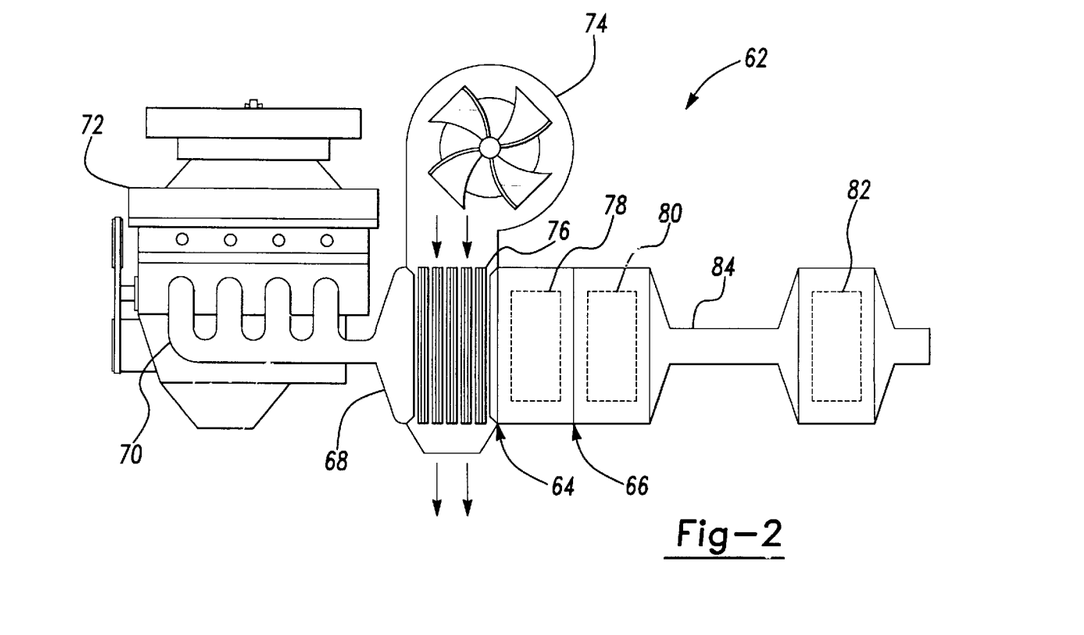
FIG. 2 is a schematic diagram showing a system for controlling the temperature of the exhaust emissions from an internal combustion engine in accordance with an alternative embodiment of the present invention.

FIG. 2 shows a system 62 that cools exhaust emissions, according to another embodiment of the present invention. In this embodiment, a heat exchanger 64 and a catalytic converter 66 are intimately connected within a single enclosure. By combining the heat exchanger 64 and the catalytic converter 66 into a single enclosure, the cooling required by the heat exchanger 64 can be reduced. In this embodiment, an inlet cone 68 to the heat exchanger 64 is connected almost directly to an exhaust manifold 70 of an internal combustion engine 72. A variable speed fan 74 delivers cooling air through the tubes 76 within the heat exchanger 64 to is cool the exhaust emissions travelling into the catalytic converter 66 in the manner as discussed above. The system 62 would also use the controller and temperature sensors as discussed above. In this embodiment, the catalytic converter 66 includes a first catalyst 78 and a second catalyst 80. The first catalyst 78 is, for example, copper-zeolite, and has the higher effective operating temperature range. The second catalyst 80 is, for example, platinum-alumina, and has the lower effective operating temperature range. Of course, other catalysts, or combination of catalysts, may also be used. In this configuration, the exhaust emissions cooled by the heat exchanger 64 are at a higher temperature when they enter the first catalyst 78 because they are closer to the engine 72, and cooler when they reach the catalyst 80 because they are farther from the engine 72. Therefore, the energy used by the fan 74 can be reduced in the operation discussed above when the catalysts are in this configuration, since the exhaust emissions temperature can be higher when they exit the heat exchanger 64.

As a further option, the catalytic converter 66 is shown to include a third catalyst 82 which is connected to the second catalyst 80 by an exhaust pipe 84 and is even farther from the engine 72. Therefore, the exhaust emissions that reach the catalyst 82 are even more cooled than those travelling through the catalyst 80. Depending on the temperature of the exhaust emissions entering the heat exchanger 64, the heat exchanger 64 can cool the exhaust emissions in accordance with the exhaust emissions algorithm so that one of either the catalyst 78, the catalyst 80 or the catalyst 82 will convert the NOx pollutants to harmless by-products.

The embodiment shown in FIG. 2 is intended to represent that the position of the heat exchanger and catalysts in the exhaust path can be at any desirable location in accordance with a particular catalytic conversion scheme as programmed in the controller 50. Additionally, any desirable number of catalysts, or combination of different catalysts at different locations in the exhaust path is also contemplated by the invention. Further, more than one heat exchanger can be used at different locations in the exhaust path, or different locations relative to the catalysts. One of skill in the art would be able to determine the desirable location of the heat exchanger and catalysts as taught by the present invention for a particular application, engine type, vehicle type, energy consumption requirements, desirable catalytic conversion effectiveness for legislative requirements, etc.

The discussion above concerns cooling the exhaust emissions to be within the operating temperature range of the catalyst. Such a procedure is necessary for most of the operation of the vehicle. However, at vehicle start-up, during extended periods of engine idling or in extreme cold conditions at low engine demands, it may be desirable to heat the exhaust emissions prior to delivery to the catalytic converter. Also, catalysts with higher operating temperature ranges may be more effective at removing the pollutants. Supplemental electrical heating can be provided when the exhaust gasses are under 180° C., for example, when the platinum-alumina catalyst is being used alone, or between 220° C. and 380° C., for example, when using both the platinum-alumina and copper-zeolite catalyst. This further reduces the time when the catalysts are inactive to reduce NOx emissions further. To provide such heating capacity, a heating unit 86 is shown installed in the exhaust emissions flow path of the heat exchanger 20, and represents an electrical heater controlled by the controller 50 to heat the exhaust gasses flowing through the heat exchanger 20 to perform this function. The heating unit 86 is intended to represent any suitable heating unit for heating exhaust emission in a vehicle exhaust system. The algorithm within the controller 50 would be programmed so that heating or cooling of the exhaust emissions can be provided based on the temperature and gas flow rate of the exhaust emissions at different locations in the exhaust emissions path in the manner as discussed above. In accordance with the teachings of another embodiment of the invention, external cooling of the catalyst can be achieved if the catalytic converter is redesigned to accommodate external cooling of the catalyst substrate itself. Known catalytic converters typically include an outer tube or pipe enclosing a honeycomb structure of a catalyst substrate on which is formed the particular catalyst. The exhaust emissions are directed through the honeycomb structure such that the gasses interact with the catalyst within the converter. External cooling of the catalyst will provide protection against overheating of the catalyst due to high engine loads, and thus permit relocation of the catalyst closer to the engine for faster warm-up while still maintaining long-term durability. Because the outer tube of a typical catalytic converter is circular or oval in cross-section, and has a diameter on the order of six inches or greater, effective external cooling of the catalyst substrate is difficult. Cooling of the outside of the tube and substrate does little to cool the center of the substrate due to the long heat transfer path from the center of the substrate to any cooling medium. Additionally, cooling the outside of the substrate can cause large thermal gradients within the structure, creating thermal stresses that cause structural failure of the catalyst substrate.

If the catalytic converter is instead constructed of several small diameter cylindrical substrates, as taught by this invention, with each substrate being contained within a tube of a shell and tube heat exchanger, a cooling medium can be flowed around the tubes containing the catalyst substrates. From an exhaust-flow perspective, the system is equivalent to many small cross-section catalysts in a parallel exhaust flow path with a total cross-sectional exposed catalyst area equal to that of a traditional single cylindrical or oval cross-section catalyst. The use of small cross-section catalysts reduces the radial length of the heat flow path from the center of the substrates to their outer surface, thus reducing the temperature gradient throughout the substrates and the thermal stresses within the substrates. Additionally, the arrangement of many catalysts, each in its own tube, provides more perimeter surface area exposed to a cooling medium than would be possible with a single large substrate with equal exhaust flow or cross-sectional area.

Figures 3, 4, 5:
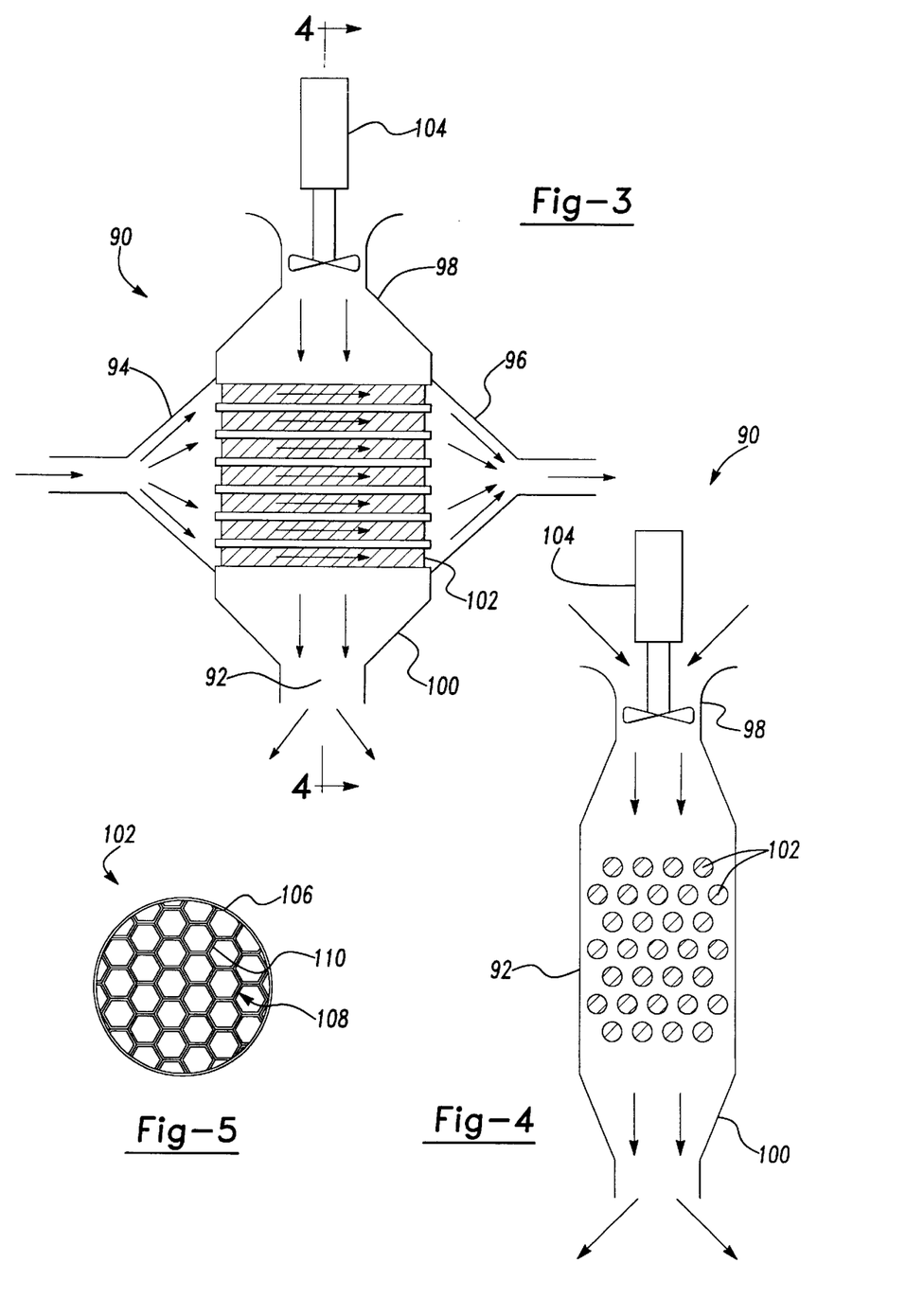
FIG. 3 is a plan view of a combination catalytic converter and heat exchanger to control the temperature of the exhaust emissions travelling through the catalytic converter, according to another embodiment of the present invention.
FIG. 4 is an end view of the combination heat exchanger and catalytic converter through line 4—4 of FIG. 3.
FIG. 5 is an end view of one of the cooling tubes of the combination heat exchanger and catalytic converter of FIG. 3.

FIG. 3 shows a plan view of a combination heat exchanger and catalytic converter unit 90 that incorporates this concept in accordance with the teachings of the present invention. FIG. 4 shows a cross-sectional view of the unit 90 taken generally along line 4—4. Instead of providing a separate heat exchanger and catalyst, this embodiment combines the two into a single unit. The unit 90 can be located at any location along the exhaust path in accordance with the discussions above. The unit 90 would also use the controller and temperature sensors as discussed above. The unit 90 includes an outer housing 92 including an exhaust emissions inlet cone 94, an exhaust emissions exit cone 96, a coolant entrance cone 98 and a coolant exit cone 100. A plurality of spaced-apart parallel tubes 102 are aligned with the entrance cone 94 and the exit cone 96. A directing plate (not shown) including holes aligned with ends of the tubes 102 would be at both ends of the tubes 102 so that the exhaust emissions are directed into and out of the tubes 102. Exhaust emissions that enter the entrance cone 94 from an exhaust pipe enter the tubes 102, travel through the tubes 102 and exit through the exit cone 96 to be exhausted from the vehicle through the tail pipe. Cooling air provided by a fan 104 enters the coolant entrance cone 98, travels around the tubes 102 and exits the unit 90 through the coolant exit cone 100. Therefore, the coolant air from the fan 104 removes heat from the exhaust emissions travelling through the tubes 102 in a typical heat exchange manner. A heating unit can be placed in the exhaust emission flow path within the inlet cone 94 for example, to heat the exhaust emissions travelling through the catalytic converter unit 90 in the same manner as the heating unit 86 is used above.

As mentioned above, known catalytic converters include an outer tube enclosing a catalyst material secured to a ceramic or metal substrate in a honeycomb type configuration. Typically, the outer tube is on the order of six inches in diameter and can have various shapes, such as circular and oval. In accordance with the invention, the tubes 102 are smaller in diameter and specially configured. The number of tubes 102, the diameter of the tubes 102 and the spacing between the tubes 102 is dependent upon the factors discussed above, such as the desired temperature of the exhaust emissions, position of the catalytic converter unit 90, the type of catalyst being used, etc. In the unit 90, each of the tubes 102 includes an outer housing 106 made of, for example, stainless steel and an internal catalyst structure 108 that is of the known honeycomb design, as shown in FIG. 5. Particularly, a honeycomb substrate 110 made of a metal or ceramic material is dipped in a catalyst material and dried so that the catalyst covers the substrate 110.

Additionally, the honeycomb substrate 110 can include more than one type of catalyst, or separate tubes 102 can include different catalysts in accordance with the teachings of the present invention. For example, some of the tubes 102 can include the platinum-alumina catalyst and other of the tubes 102 can include the copper-zeolite catalyst, as discussed above. The different tubes 102 can have different catalysts depending on the particular scheme for a certain application. Additionally, a single tube 102 can have different catalyst materials. For example, one end of the tube closest to the inlet cone 94 can have a higher temperature catalyst, and the other end of the tube 102 closest to the exit cone 96 can have a lower temperature catalyst, based on the discussion above. Any variation of any number of catalysts in the unit 90 in accordance with a particular catalyst cooling scheme is well within the scope of the present is invention. Further, more than one unit 90 can be included in a single exhaust path. In this embodiment, the diameter of the tubes 102 is reduced to the order of an inch or less so that the cooling air travelling around the tubes 102 can effectively cool the inside of the tubes 102 and ensure that the temperature variation between the perimeter and central core of the catalyst substrate is consistent with the effective catalyst operating temperature range for maximum exhaust emissions conversion. Of course, the size of the tubes 102 is dependent upon the catalyst material, the cooling ability of the fan 104, the configuration of the tubes 102, etc., and as such this diameter can vary from design to design.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A system for controlling the temperature of exhaust emissions from an engine, said system comprising:
   a heat exchanger having an inlet receiving the exhaust emissions from the engine, an outlet, and a cooling system for cooling the exhaust emissions flowing within the heat exchanger between the inlet and the outlet;
   a catalytic converter having an inlet receiving the cooled exhaust emissions from the outlet of the heat exchanger, an outlet, and a catalyst for removing pollutants from the exhaust emissions;
   a plurality of temperature sensors for measuring temperature at certain locations relative to the exhaust emissions, said plurality of temperature sensors including an ambient temperature sensor positioned to provide a temperature signal of the ambient temperature; and
   a controller providing an output signal to the cooling system of the heat exchanger so as to controllably vary the amount of cooling, the controller being responsive to the temperature signal from the ambient temperature sensor and other temperature signals from the plurality of temperature sensors to determine the amount of cooling to be provided by the cooling system.

2. The system according to claim 1 wherein the cooling system includes a fan and a variable speed motor for driving the fan in response to the output signal from the controller, the fan operable to force cooling air to pass through the heat exchanger at variable speeds to vary the amount of cooling of the exhaust emissions flowing from the inlet to the outlet of the heat exchanger.

3. The system according to claim 1 wherein the plurality of temperature sensors includes a temperature sensor located in the outlet of the catalytic converter.

4. The system according to claim 1 wherein the plurality of temperature sensors includes a first temperature sensor and a second temperature sensor, the first temperature sensor being positioned to provide a first temperature input signal to the controller indicative of the temperature of the exhaust emissions entering the inlet of the heat exchanger and the second temperature sensor being positioned to provide a second temperature input signal to the controller indicative of the temperature of the exhaust emissions discharged from the outlet of the catalytic converter.

5. The system according to claim 4 wherein the plurality of temperature sensors includes a third temperature sensor positioned to provide a third temperature input signal to the controller indicative of the temperature of the exhaust emissions exiting the heat exchanger and entering the catalytic converter.

6. The system according to claim 1 further comprising a humidity sensor incorporated in combination with the ambient temperature sensor, said humidity sensor providing a humidity signal to the controller indicative of the ambient humidity.

7. The system according to claim 1 wherein the engine provides a first input signal to the controller indicative of the engine speed and a second input signal to the controller indicative of the engine load, said controller determining the temperature of the exhaust emissions and gas flow rate of the exhaust emissions flowing into the inlet of the heat exchanger based on the first and second input signals.

8. The system according to claim 1 wherein the heat exchanger and the catalytic converter are combined within a common housing.

9. The system according to claim 1 wherein the catalytic converter includes a plurality of catalysts where at least two of the catalysts have a different effective temperature operating range.

10. The system according to claim 9 wherein the plurality of catalysts is a first catalyst and a second catalyst, said first catalyst having an effective temperature operating range of 180–220° C. and said second catalyst having an effective temperature operating range of 380–420° C.

11. The system according to claim 9 wherein the plurality of catalysts includes a first catalyst, a second catalyst, and a third catalyst, said first and second catalysts being positioned within a common housing, said first catalyst being positioned farther upstream than the second catalyst within the common housing, and the third catalyst being positioned within a separate housing downstream from the common housing.

12. The system according to claim 11 wherein in the first catalyst has an effective temperature operating range of 380–420° C. and the second catalyst has an effective temperature operating range of 180–220° C.

13. The system according to claim 1 wherein the heat exchanger is positioned directly after an exhaust manifold of the engine.

14. The system according to claim 1 wherein the heat exchanger is a shell and tube type heat exchanger including staggered tubes.

15. The system according to claim 1 wherein the heat exchanger further includes a heating system for heating the exhaust emissions within the heat exchanger.

16. The system according to claim 1 wherein the engine is a lean-burn engine selected from the group consisting of diesel engines, two-stroke engines, and lean-burn gasoline engines.

17. A system for controlling the temperature of exhaust emissions from an engine, said system comprising:
   a heat exchanger including an inlet and an outlet, said inlet receiving the exhaust emissions from the engine, said heat exchanger further including a cooling system for cooling the exhaust emissions within the heat exchanger, said cooling system including a fan and a variable speed fan motor, said fan forcing cooling air through the heat exchanger at variable speeds to vary the amount of cooling of the exhaust emissions within the heat exchanger;
   a catalytic conversion system including a plurality of catalysts where at least two of the catalyst have different effective temperature operating ranges, said catalytic conversion system receiving the cooled exhaust emissions from the heat exchanger and removing pollutants from the exhaust emissions;
   a first temperature sensor, said first temperature sensor being positioned to provide a first temperature input signal indicative of the temperature of the exhaust emissions entering the heat exchanger;

a second temperature sensor, said second temperature sensor being positioned to provide a second temperature input signal indicative of the temperature of the exhaust emissions exiting one of the catalysts;

an ambient temperature sensor positioned to provide a temperature signal indicative of the ambient temperature; and a controller, said controller providing an output signal to the fan motor to adjust the speed of the fan and the level of cooling of the exhaust emissions within the heat exchanger, said controller being responsive to the first and second temperature input signals and the ambient temperature signal to determine the amount of cooling provided by the cooling system.

18. The system according to claim 17 further comprising a humidity sensor incorporated in combination with the ambient temperature sensor, said humidity sensor providing a humidity signal to the controller indicative of the ambient humidity.

19. The system according to claim 17 wherein the engine provides a first engine input signal to the controller indicative of the engine speed and a second engine input signal to the controller indicative of the engine load, said controller determining the temperature of the exhaust emissions and gas flow rate of the exhaust emission based on the first and second input signals.

20. The system according to claim 17 wherein the plurality of catalysts is a first catalyst and a second catalyst, said first catalyst having an effective temperature operating range of 180–220° C. and said second catalyst having an effective temperature operating range of 380–420° C.

21. The system according to claim 17 wherein the plurality of catalysts includes a first catalyst, a second catalyst, and a third catalyst, said first and second catalysts being positioned within a common housing, said first catalyst being positioned farther upstream than the second catalyst within the common housing, and the third catalyst being positioned within a separate housing downstream from the common housing.

22. The system according to claim 21 wherein the first catalyst has an effective temperature operating range of 380–420° C. and the second catalyst has an effective temperature operating range of 180–220° C.

23. The system according to claim 17 wherein the heat exchanger further includes a heating system for heating the exhaust emissions within the heat exchanger.

24. The system according to claim 17 wherein the heat exchanger and the catalytic conversion system are combined within the common housing.

25. A system for removing pollutants from exhaust emissions generated by an engine, said system comprising:

a plurality of catalysts positioned within an exhaust path of the exhaust emissions, at least two of the plurality of catalysts being part of separate catalyst structures positioned within a common housing and having different effective temperature operating ranges so that the at least two of the plurality of catalysts act on the exhaust emissions at about the same location, said plurality of catalysts acting to remove the pollutants from the exhaust emissions; and a temperature adjustment system positioned in the exhaust path to adjust the temperature of the exhaust emissions, said temperature adjustment system including an ambient temperature sensor positioned to provide a temperature signal indicative of the ambient temperature, said temperature adjusting system adjusting the temperature of the exhaust emissions to be in the effective temperature operating range of at least one of the catalysts.

26. The system according to claim 25 wherein the plurality of catalysts and the temperature adjustment system are combined in a common housing.

27. The system according to claim 25 wherein the temperature adjustment system is a heat exchanger that cools the exhaust emissions by forced air.

28. The system according to claim 25 wherein the at least two of the plurality of catalysts includes a first catalyst having an effective temperature operating range of 180–220° C. and a second catalyst having an effective temperature operating range of 380–420° C.

29. A method for controlling the temperature of exhaust emissions from an engine, said method comprising the steps of:

providing a heat exchanger;

directing the exhaust emissions into the heat exchanger;

cooling the exhaust emissions within the heat exchanger;

providing at least one catalyst;

directing the exhaust emissions from the heat exchanger to the at least one catalyst to remove pollutants from the exhaust emissions;

providing a plurality of temperature sensors including at least one temperature sensor for measuring the temperature of the exhaust emissions and an ambient temperature sensor for measuring the ambient temperature; and controlling the amount of cooling within the heat exchanger so as to control the temperature of the exhaust emissions, said step of controlling the amount of cooling including using the measured temperature of the exhaust emissions and the ambient temperature to control the amount of cooling of the exhaust emissions.

30. The method according to claim 29 wherein the step of cooling the exhaust emissions in the heat exchanger includes using a variable speed fan to force cooling air through the heat exchanger.

31. The method according to claim 29 wherein the step of providing a plurality of temperature sensors includes providing a first temperature sensor and a second temperature sensor where the first temperature sensor provides a first temperature input signal indicative of the temperature of the exhaust emissions entering the heat exchanger and the second temperature sensor provides a second temperature input signal indicative of the temperature of the exhaust emissions exiting the catalyst, said step of controlling the amount of cooling including using both the first and second temperature input signals to control the amount of cooling of the exhaust emissions.

32. The method according to claim 31 wherein the plurality of temperature sensors includes a third temperature sensor that provides a third temperature input signal indicative of the temperature of the cooled exhaust emissions from the heat exchanger, said step of controlling the amount of cooling including using the third temperature input signal to control the amount of cooling of the exhaust emissions.

33. The method according to claim 29 further comprising the steps of providing an engine speed signal and an engine load signal, said step of controlling the amount of cooling including determining the temperature of the exhaust emissions and the gas flow rate of the exhaust emissions based on the engine speed signal and the engine load signal.

34. The method according to claim 29 wherein the step of providing a heat exchanger and providing at least one catalyst includes providing the heat exchanger and the at least one catalyst within a common housing.

35. The method according to claim 29 wherein the step of providing at least one catalyst includes providing a plurality of catalyst where at least two of the catalysts have a different effective temperature operating range.

36. The method according to claim 35 wherein the step of providing a plurality of catalysts includes providing a first catalyst having an effective temperature operating range of 180–220° C. and a second catalyst having an effective temperature operating range of 380–420° C.

37. The method according to claim 35 wherein the step of providing a plurality of catalysts includes providing a first catalyst, a second catalyst and a third catalyst, and providing the first and second catalysts within a common housing where the first catalyst is positioned farther upstream than the second catalyst, and providing the third catalyst within a separate housing downstream from the common housing.

38. The method according to claim 29 wherein the step of providing a heat exchanger includes providing a heat exchanger directly after an exhaust manifold of the engine.

39. The method according to claim 29 wherein the step of providing the heat exchanger includes providing a shell and tube type heat exchanger including staggered tubes.

40. The method according to claim 29 further comprising the step of heating the exhaust emissions within the heat exchanger.

41. A system for controlling the temperature of exhaust emissions from an engine, said system comprising:
   a heat exchanger having an inlet receiving the exhaust emissions from the engine, an outlet, and a cooling system for cooling the exhaust emissions flowing within the heat exchanger between the inlet and the outlet;
   a catalytic converter having an inlet receiving the cooled exhaust emissions from the outlet of the heat exchanger, an outlet, and a catalyst for removing pollutants from the exhaust emissions;
   a plurality of temperature sensors for measuring the temperature of the exhaust emissions, said plurality of temperature sensors including a first temperature sensor positioned to measure a first temperature of the exhaust emissions entering the inlet of the heat exchanger, a second temperature sensor being positioned to measure a second temperature of the exhaust emission discharged from the outlet of the catalytic converter, and a third temperature sensor positioned to measure a third temperature of the exhaust emissions exiting the heat exchanger and entering the catalytic converter; and
   a controller providing an output signal to the cooling system of the heat exchanger so as to controllably vary the amount of cooling, the controller being responsive to a first temperature input signal from the first temperature sensor indicative of the first temperature, a second temperature input signal from the second temperature sensor indicative of the second temperature and a third temperature input signal from the third temperature sensor indicative of the third temperature to determine the amount of cooling to be provided by the cooling system.

42. A system for controlling the temperature of exhaust emissions from an engine, said system comprising:
   a heat exchanger having an inlet receiving the exhaust emissions from the engine, an outlet, and a cooling system for cooling the exhaust emissions flowing within the heat exchanger between the inlet and the outlet;
   a catalytic converter having an inlet receiving the cooled exhaust emissions from the outlet of the heat exchanger, an outlet, and a catalyst for removing pollutants from the exhaust emissions, said catalytic converter including a plurality of catalysts where at least two of the catalysts have a different effective temperature operating range, said plurality of catalysts including a first catalyst, a second catalyst and a third catalyst, said first and second catalysts being positioned within a common housing, said first catalyst being positioned farther upstream than the second catalyst within the common housing, and the third catalyst being positioned within a separate housing downstream from the common housing; and
   a controller providing an output signal to the cooling system of the heat exchanger so as to controllably vary the amount of cooling, the controller being responsive to input data that is used to determine the amount of cooling to be provided by the cooling system.

43. A system for controlling the temperature of exhaust emissions from an engine, said system comprising:
   a heat exchanger having an inlet receiving the exhaust emissions from the engine, an outlet, and a cooling system for cooling the exhaust emissions flowing within the heat exchanger between the inlet and the outlet, said heat exchanger further including a heating system for heating the exhaust emissions within the heat exchanger;
   a catalytic converter having an inlet receiving the cooled exhaust emissions from the outlet of the heat exchanger, an outlet, and a catalyst for removing pollutants from the exhaust emissions; and
   a controller providing an output signal to the cooling system of the heat exchanger so as to controllably vary the amount of cooling, the controller being responsive to input data that is used to determine the amount of cooling to be provided by the cooling system.

44. A system for controlling the temperature of exhaust emissions from an engine, said system comprising:
   a heat exchanger having an inlet receiving the exhaust emissions from the engine, an outlet, and a cooling system for cooling the exhaust emissions flowing within the heat exchanger between the inlet and the outlet;
   a catalytic converter having an inlet receiving the cooled exhaust emissions from the outlet of the heat exchanger, an outlet, and a catalyst for removing pollutants from the exhaust emissions;
   a humidity sensor positioned to measure the ambient humidity around the system; and
   a controller providing an output signal to the cooling system of the heat exchanger so as to controllably vary the amount of cooling, the controller being responsive to a humidity signal form the humidity sensor and other input data that is used to determine the amount of cooling to be provided by the cooling system.

45. A system for controlling the temperature of exhaust emissions from an engine, said system comprising:
   a heat exchanger including an inlet and an outlet, said inlet receiving the exhaust emissions from the engine, said heat exchanger further including a cooling system for cooling the exhaust emissions within the heat exchanger, said cooling system including a fan and a variable speed fan motor, said fan forcing cooling air through the heat exchanger at variable speeds to vary the amount of cooling of the exhaust emissions within the heat exchanger;

a catalytic conversion system including a plurality of catalysts where at least two of the catalyst have different effective temperature operating ranges, said catalytic conversion system receiving the cooled exhaust emissions from the heat exchanger and removing pollutants from the exhaust emissions, said plurality of catalysts including a first catalyst, a second catalyst and a third catalyst, said first and second catalyst being positioned within a common housing, said first catalyst being positioned farther upstream than the second catalyst within the common housing, and the third catalyst being positioned within a separate housing downstream from the common housing;

a first temperature sensor, said first temperature sensor being positioned to provide a first temperature input signal indicative of the temperature of the exhaust emissions entering the heat exchanger;

a second temperature sensor, said second temperature sensor being positioned to provide a second temperature input signal indicative of the temperature of the exhaust emissions exiting one of the catalysts; and a controller, said controller providing an output signal to the fan motor to adjust the speed of the fan and the level of cooling of the exhaust emissions within the heat exchanger, said controller being responsive to the first and second temperature input signals to determine the amount of cooling provided by the cooling system.

46. A system for controlling the temperature of exhaust emissions from an engine, said system comprising:

a heat exchanger including an inlet and an outlet, said inlet receiving the exhaust emissions from the engine, said heat exchanger further including a cooling system for cooling the exhaust emissions within the heat exchanger, said cooling system including a fan and a variable speed fan motor, said fan forcing cooling air through the heat exchanger at variable speeds to vary the amount of cooling of the exhaust emissions within the heat exchanger, said heat exchanger further including a heating system for heating the exhaust emissions within the heat exchanger;

a catalytic conversion system including a plurality of catalysts where at least two of the catalyst have different effective temperature operating ranges, said catalytic conversion system receiving the cooled exhaust emissions from the heat exchanger and removing pollutants from the exhaust emissions;

a first temperature sensor, said first temperature sensor being positioned to provide a first temperature input signal indicative of the temperature of the exhaust emissions entering the heat exchanger;

a second temperature sensor, said second temperature sensor being positioned to provide a second temperature input signal indicative of the temperature of the exhaust emissions exiting one of the catalysts; and a controller, said controller providing an output signal to the fan motor to adjust the speed of the fan and the level of cooling of the exhaust emissions within the heat exchanger, said controller being responsive to the first and second temperature input signals to determine the amount of cooling provided by the cooling system.

47. A method for controlling the temperature of exhaust emissions from an engine, said method comprising the steps of:

providing a heat exchanger;

directing the exhaust emissions into the heat exchanger;

cooling the exhaust emissions within the heat exchanger;

providing at least one catalyst;

directing the exhaust emissions from the heat exchanger to the at least one catalyst to remove pollutants from the exhaust emissions;

providing a plurality of temperature sensors including a first temperature sensor that measures the temperatures of the exhaust emissions entering the heat exchanger and a second temperature sensor that measures the temperature of the exhaust emissions exiting the catalyst; and controlling the amount of cooling within the heat exchanger so as to control the temperature of the exhaust emissions, said step of controlling the amount of cooling including using both the first and second measured temperatures to control the amount of cooling of the exhaust emissions.

48. A method for controlling the temperature of exhaust emissions from an engine, said method comprising the steps of:

providing a heat exchanger;

directing the exhaust emissions into the heat exchanger;

cooling the exhaust emissions within the heat exchanger;

providing a plurality of catalysts where at least two of the catalysts have a different effective temperature operating range, said step of providing a plurality of catalysts including providing a first catalyst, a second catalyst and a third catalyst, where the first and second catalysts are provided within a common housing where the first catalyst is positioned farther upstream than the second catalyst, and the third catalyst is positioned within a separate housing downstream from the common housing;

directing the exhaust emissions from the heat exchanger to the at least one catalyst to remove pollutants from the exhaust emissions; and controlling the amount of cooling within the heat exchanger so as to control the temperature of the exhaust emissions.

49. A method for controlling the temperature of exhaust emissions from an engine, said method comprising the steps of:

providing a heat exchanger;

directing the exhaust emissions into the heat exchanger;

cooling the exhaust emissions within the heat exchanger;

providing at least one catalyst;

directing the exhaust emissions from the heat exchanger to the at least one catalyst to remove pollutants from the exhaust emissions;

controlling the amount of cooling within the heat exchanger so as to control the temperature of the exhaust emissions; and heating the exhaust emissions within the heat exchanger.

* * * * *